United States Patent
Kim et al.

(10) Patent No.: US 8,185,739 B2
(45) Date of Patent: May 22, 2012

(54) METHOD AND SYSTEM FOR DETECTING SUCCESSFUL AUTHENTICATION OF MULTIPLE PORTS IN A TIME-BASED ROVING ARCHITECTURE

(75) Inventors: Myoung Hwan Kim, Yongin-si (KR); Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 629 days.

(21) Appl. No.: 12/351,712

(22) Filed: Jan. 9, 2009

(65) Prior Publication Data
US 2010/0180115 A1  Jul. 15, 2010

(51) Int. Cl.
*H04L 9/32* (2006.01)
(52) U.S. Cl. .................................................. 713/168
(58) Field of Classification Search .................. 713/168, 713/158
See application file for complete search history.

(56) References Cited

U.S. PATENT DOCUMENTS

| | | | | |
|---|---|---|---|---|
| 5,610,953 A * | 3/1997 | Betts et al. | | 375/373 |
| 5,767,784 A * | 6/1998 | Khamharn | | 340/5.23 |
| 6,643,781 B1 * | 11/2003 | Merriam | | 726/35 |
| 6,697,490 B1 * | 2/2004 | Mizikovsky et al. | | 380/262 |
| 7,512,238 B2 * | 3/2009 | Graunke | | 380/260 |
| 7,657,672 B2 * | 2/2010 | Kampmann et al. | | 710/52 |
| 7,826,562 B2 * | 11/2010 | Nio et al. | | 375/316 |
| 7,937,501 B2 * | 5/2011 | Goodart et al. | | 710/2 |
| 2004/0218624 A1 * | 11/2004 | Kobayashi | | 370/463 |
| 2005/0198528 A1 | 9/2005 | Unger | | |
| 2006/0095623 A1 * | 5/2006 | Nio et al. | | 710/260 |
| 2006/0269056 A1 * | 11/2006 | Montag | | 380/205 |
| 2007/0130625 A1 * | 6/2007 | Lee | | 726/26 |
| 2008/0008172 A1 * | 1/2008 | Kobayashi | | 370/389 |
| 2008/0008317 A1 * | 1/2008 | Graunke | | 380/200 |
| 2008/0013725 A1 * | 1/2008 | Kobayashi | | 380/203 |
| 2008/0172501 A1 * | 7/2008 | Goodart et al. | | 710/33 |
| 2008/0172708 A1 * | 7/2008 | Perry et al. | | 725/110 |
| 2010/0177892 A1 * | 7/2010 | Choi et al. | | 380/201 |

FOREIGN PATENT DOCUMENTS
EP  1793602  6/2007

OTHER PUBLICATIONS
"High-bandwidth Digital Content Protection System", *Revision 1.3, Digital Content Protection LLC*, Beaverton, OR, (Dec. 21, 2006).

(Continued)

*Primary Examiner* — Saleh Najjar
*Assistant Examiner* — Shu Chun Gao
(74) *Attorney, Agent, or Firm* — Blakely, Sokoloff, Taylor & Zafman LLP

(57) ABSTRACT

In one embodiment of the present invention, a method includes authenticating an HDCP transmitting device at a first port of an HDCP receiving device. A port of the HDCP receiving device is connected to a pipe of an HDCP architecture of the HDCP receiving device at a first time. A synchronization signal is received from the HDCP transmitting device at the port of the HDCP receiving device at a second time. A loss of synchronization between the HDCP transmitting device and the HDCP receiving device is detected when the time-span between the first time and the second time is not greater than the period of time between synchronization signals sent from the HDCP transmitting device. A re-authentication is initiated between the HDCP transmitting device and the HDCP receiving device in response to detecting the loss of synchronization.

12 Claims, 5 Drawing Sheets

OTHER PUBLICATIONS

"International Search Report and Written Opinion of the International Search Authority", *International Application No. PCT/US2009/06973*, (Apr. 14, 2010).

International Preliminary Report on Patentability for International Patent Application No. PCT/US2009/069873, Mailed Jul. 21, 2011, 6 pages.

* cited by examiner

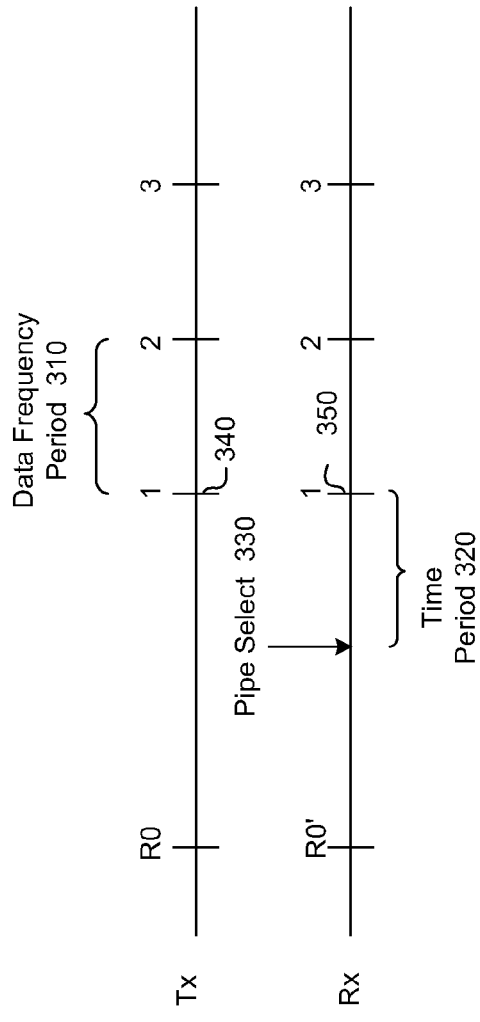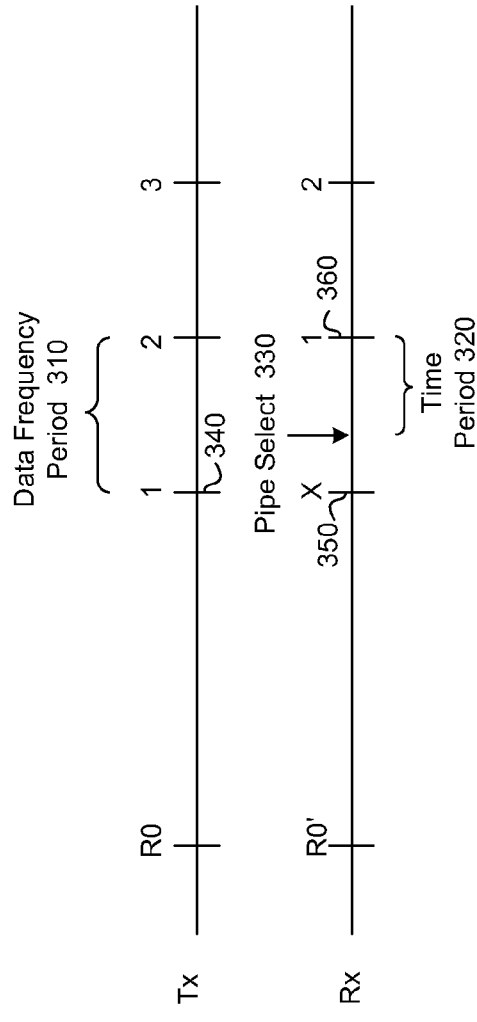

METHOD AND SYSTEM FOR DETECTING SUCCESSFUL AUTHENTICATION OF MULTIPLE PORTS IN A TIME-BASED ROVING ARCHITECTURE

FIELD

Embodiments of the present invention relates to the field of High-bandwidth Digital Content Protection (HDCP), and in particular, to authenticating multiple ports of an HDCP device implementing a time-based roving architecture.

BACKGROUND

In a conventional HDCP architecture, a single protected port of a receiving device requires a dedicated pipe and an HDCP engine. A receiving device with n ports, therefore, requires n pipes and n HDCP engines. An improvement over the conventional HDCP architecture allows multiple ports to be supported by only two pipes, a main pipe and a time-based roving pipe.

One problem of the improved architecture is that a port may lose a first CTL3 (encrypt synchronization signal) signal from a transmitting device if no pipe is selected for the port when the first CTL3 comes in. Some devices may detect such a situation using a method of Ri comparison. Many transmitting devices on the market, however, cannot detect Ri mismatches and perform a re-authentication to fix the problem. In such a case, the user will see snow noise on the display device rather than the desired viewing data. If the input stream is an HDMI stream, this issue may be resolved using ECC error. However, for a DVI stream, since there is no audio packet, there is no ECC error even if there is a Ri mismatch; hence, snow noise may continue indefinitely.

It is therefore desirable to be able to detect a situation at the receiving device where a port in a time-based roving architecture has lost a CTL3 signal from a transmitting device.

SUMMARY

Embodiments of the present invention relates to the field of High-bandwidth Digital Content Protection (HDCP), and in particular, to authenticating multiple ports of an HDCP device implementing a time-based roving architecture.

In one embodiment, a method includes authenticating an HDCP transmitting device at a first port of an HDCP receiving device. A port of the HDCP receiving device is connected to a pipe of an HDCP architecture of the HDCP receiving device at a first time. A synchronization signal is received from the HDCP transmitting device at the port of the HDCP receiving device at a second time. A loss of synchronization between the HDCP transmitting device and the HDCP receiving device is detected when the time-span between the first time and the second time is not greater than the period of time between synchronization signals sent from the HDCP transmitting device. A re-authentication is initiated between the HDCP transmitting device and the HDCP receiving device in response to detecting the loss of synchronization.

In one embodiment, an apparatus includes an HDCP receiving device including a port to authenticate an HDCP transmitting device. An HDCP architecture of the HDCP receiving device connects the port of the HDCP receiving device to a pipe of the HDCP architecture at a first time. The first port to receives a synchronization signal from the HDCP transmitting device at a second time. A synchronization detector detects a loss of synchronization between the HDCP transmitting device and the HDCP receiving device when the time-span between the first time and the second time is not greater than the period of time between synchronization signals sent from the HDCP transmitting device. The synchronization detector initiates a re-authentication between the HDCP transmitting device and the HDCP receiving device in response to detecting the loss of synchronization.

In one embodiment, a system includes an HDCP transmitting device coupled to a port of an HDCP receiving device. The HDCP transmitting device transmits a data stream and synchronization signals to the HDCP receiving device. An HDCP receiving device includes a port to authenticate an HDCP transmitting device. The HDCP receiving device includes an HDCP architecture. The HDCP architecture of the HDCP receiving device connects the first port of the HDCP receiving device to a pipe of the HDCP architecture at a first time. The port receives a synchronization signal from the HDCP transmitting device at a second time. A synchronization detector detects a loss of synchronization between the HDCP transmitting device and the HDCP receiving device if the time-span between the first time and the second time is not greater than the period of time between synchronization signals sent from the HDCP transmitting device. The synchronization detector initiates a re-authentication between the HDCP transmitting device and the HDCP receiving device in response to detecting the loss of synchronization.

BRIEF DESCRIPTION OF THE DRAWINGS

Embodiments of the invention may be understood more fully from the detailed description given below and from the accompanying drawings of various embodiments of the invention. The drawings, however, should not be taken to be limiting, but are for explanation and understanding only.

FIGS. 3a and 3b illustrate event sequence diagrams representing embodiments of the invention.

DETAILED DESCRIPTION

Figure 1:
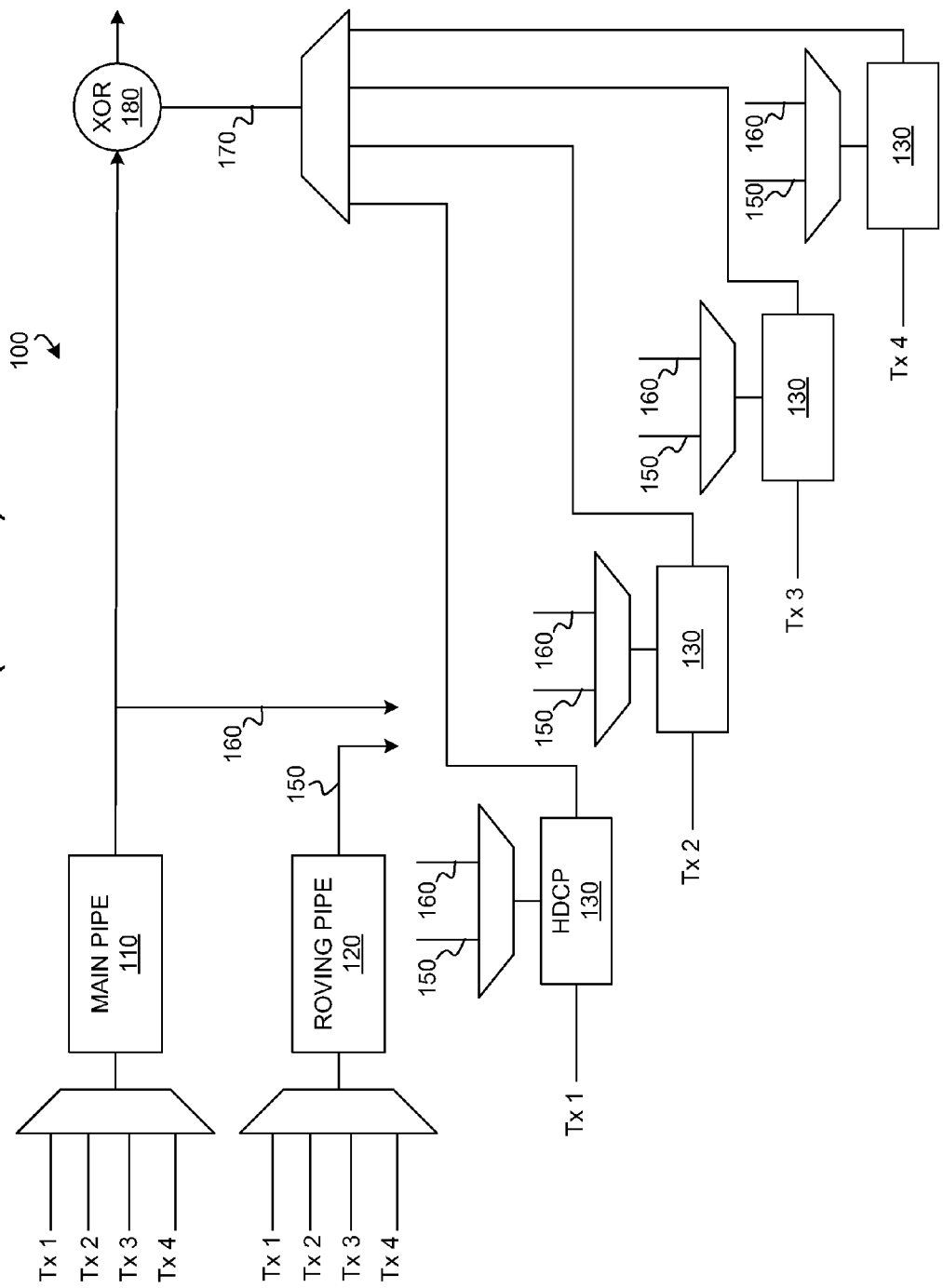
FIG. 1 illustrates an embodiment of a time-based roving architecture managing multiple ports of an HDCP receiving device.

As used herein, "Tx" will be used to generally refer to a transmitting device such as an HDCP transmitting device and "Rx" will be used to generally refer to a receiving device such as an HDCP receiving device.

A time-based roving HDCP architecture uses two pipes: main pipe and roving pipe. The main pipe is dedicated to a port selected by a user to view contents. The roving pipe roves other ports (background ports) one by one in a time-based fashion, keeping those ports authenticated and synchronized with the corresponding Txs. This implementation allows four ports to be supported with two pipes, for example.

A main pipe in a time-based roving HDCP architecture is a pipe dedicated to the port that a user selects to view content (such as movie). The pipe, in general, is composed of analog PLL, SerDes (Serializer and Deserializer) and other logics to recover the AV data from the incoming bit stream.

A roving pipe is the pipe that sequentially roves through the ports that are not connected to the main pipe. The components of the roving pipe are the same as the main pipe.

An HDCP engine is the logic block that encrypts or decrypts the media contents. Tx has an encryption engine, while Rx has a decryption engine. The HDCP engine takes care of authentication to establish a secure link between Tx and Rx, also keeping track of synchronization between Tx and Rx over the secure link. To check the synchronization, Tx checks Rx with the Ri value at every 128 frames. The Ri value is a residue value of a shared key between Tx and Rx that is updated at every frame.

A CTL3 signal is an indicator saying if the current frame is encrypted frame or not. Tx sends a CTL3 for each frame it has encrypted to let Rx know that it is an encrypted frame. There are other ways to do this in the HDCP specification, and CTL3 is just an example of a possible signaling for the ease of explanation. For purposes of this application, CTL3 shall be interpreted to mean any encryption synchronization signal, including but not limited to a CTL3 signal.

An HDCP signal includes the following: VS (Vertical Sync) and CTL3 (encryption indicator) are in the incoming AV stream for synchronization, while authentication and Ri checking are done thru I2C (DDC) bus.

As used herein, "network" or "communication network" mean an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set top box, handheld device (e.g., personal device assistant (PDA)), video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions, such as s cable set-top box can serve as a receiver (receiving information from a cable head-end) as well as a transmitter (transmitting information to a TV) and vice versa. In some embodiments, the network devices may be co located on a single local area network. In other embodiments, the network devices may span multiple network segments, such as through tunneling between local area networks. A network may also include multiple data encoding and encryption processes, and identify verification processes, such as unique signature verification and unique ID comparison according to one embodiment.

FIG. 1 illustrates an embodiment of a time-based roving architecture managing multiple ports of an HDCP receiving device. In this embodiment, HDCP data is received at multiple ports of HDCP receiving device 100. Although there are multiple ports, there is only one main pipe 110 and one roving pipe 120. Transmitting devices are designated as Tx 1 through Tx 4. The transmitting devices are coupled to a first multiplexer that is coupled to Main Pipe 110, which produces output 160. The transmitting devices are also coupled to a second multiplexer that is coupled to Roving Pipe 120, which produces output 150. For each port there is an HDCP engine 130. Each engine is coupled with a transmitting device and outputs 150 and 160. The output from the HDCP engines 130 is coupled to a multiplexer and produces output 170. XOR operator 180 is coupled to inputs 160 and 170.

Figure 2:
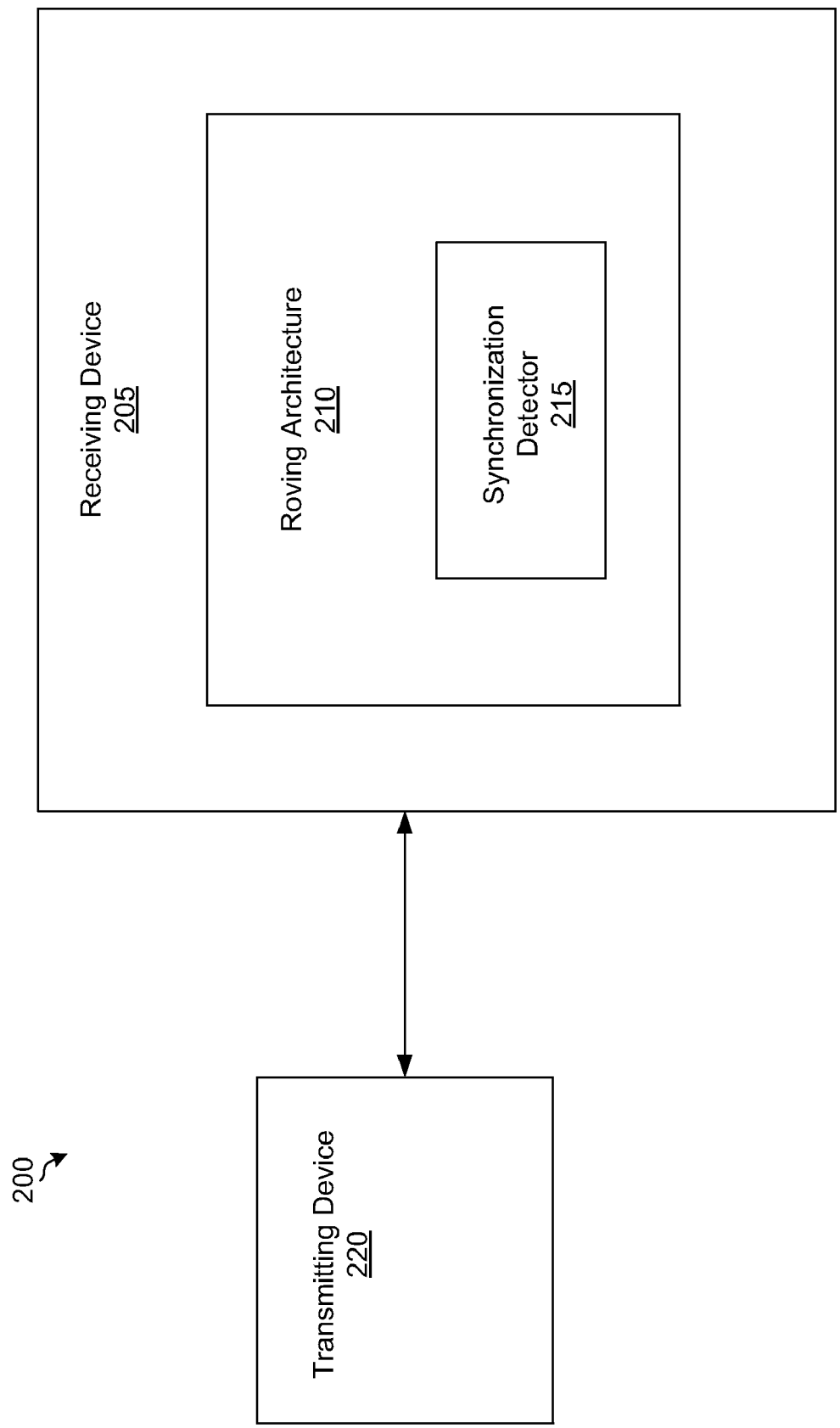
FIG. 2 illustrates a system diagram of an embodiment of the invention.

FIG. 2 illustrates a system diagram of an embodiment of the invention. System 200 includes transmitting device 220 and receiving device 205. In this embodiment, Tx 220 and Rx 205 are both HDCP devices. Rx 205 includes a time-based roving architecture, an embodiment of which is previously described in FIG. 1. Additionally, roving architecture 210 includes synchronization detector 215. Synchronization detector 215 monitors roving architecture 210, detecting whether Rx 205 has lost or could have lost a synchronization signal from Tx 220. If such a situation is detected, synchronization detector 215 may initiate a re-authentication between Tx 220 and Rx 205.

FIG. 3a illustrates a time sequence diagram of one embodiment of the invention. R0 and R0' represent the device authentication step occurring between Tx and Rx. At 330, the port is selected by the main pipe or roving pipe of the time-based roving pipe architecture. At 340, Tx sends the first CTL3 signal that is received by Rx at 350. Time period 320 is the span of time between pipe selection 330 and the receipt of CTL3 signal 350. Data frequency period 310 is the time period between consecutive CTL3 signals sent by Tx or received by Rx. If time period 320 is greater than data frequency period 310, then CTL3 signal 350 is sure to be the first signal that was sent by Tx; thus, Tx and Rx will be synchronized and a sync problem will not be detected. However, if time period 320 is not greater than data frequency period 310, then it is not certain that the CTL3 signal received at 350 was the first one sent by Tx; thus, Tx and Rx might be out of sync. In such a case, embodiments of this invention will detect this situation and may initiate re-authentication with Tx to ensure Tx and Rx remain synchronized.

FIG. 3b illustrates a time sequence diagram of one embodiment of the invention. R0 and R0' represent the device authentication step occurring between Tx and Rx. At 330, the port is selected by the main pipe or roving pipe of the time-based roving pipe architecture. Time period 320 is the span of time between pipe selection 330 and the receipt of CTL3 signal 360. Data frequency period 310 is the time period between consecutive CTL3 signals sent by Tx or received by Rx. At 340, Tx sends the first CTL3 signal. However, in this embodiment, Rx is not connected to a pipe at 350 and the first CTL3 signal is lost. Because the next CTL3 signal received by Rx at 360 will appear to be the first CTL3 signal, Tx and Rx will otherwise be out of sync resulting in snow noise. However, because time period 320 is not greater than data frequency period 310, embodiments of the invention will detect that Tx and Rx are out of sync. In such a situation, embodiments of this invention may initiate a re-authentication sequence between Tx and Rx.

Figure 4:
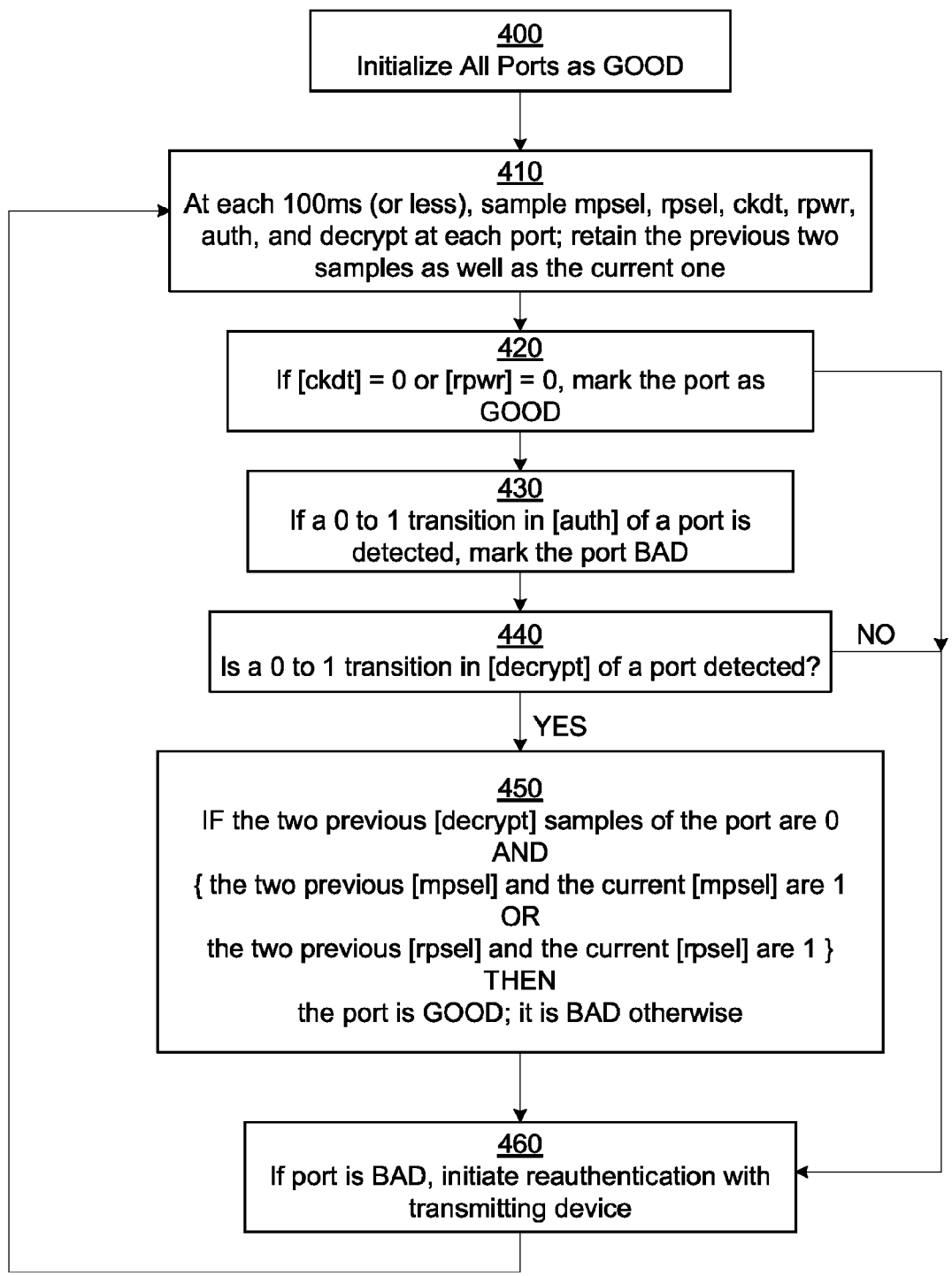
FIG. 4 illustrates a flow diagram representing an embodiment of the invention.

FIG. 4 illustrates a flow diagram of one embodiment of the invention. At 400, all ports of an HDCP receiving device are marked as GOOD initially. At 410, the ports are sampled at a rate of 100 ms or less. The sampled data for a port includes: MPSEL, indicating if that port is selected by the main pipe; RPSEL, indicating if the port is selected by the roving pipe; CKDT, indicating if a clock signal is detected at the port; RPWR, indicating if a source is connected to the port; AUTH, indicating that the port has completed the first phase of authentication (R0 calculation) with a transmitting device; and DECRYPT, indicating that a CTL3 signal has been received at the port after authentication. In addition to the currently sampled data, the data from the previous two samples is retained. At 420, if CKDT or RPWR are set to zero, meaning that the port is not connected to a source and there is no risk of being out of sync, the port is marked as GOOD and the process skips ahead to step 460. At 430, a port is marked as BAD if the AUTH value has transitioned from a previous value of 0 to a current value of 1. This value may still be changed back to GOOD at a subsequent step. At 440, if the DECRYPT value has transitioned from a previous value of 0 to a current value of 1, then the process moves to 450, otherwise it skips to 460. At 450 a port is marked as GOOD if (a) the two previous DECRYPT samples at the port are 0 AND either (b) the two previous MPSEL and the current MPSEL are 1 OR (c) the two previous RPSEL and the current RPSEL are 1 [that is, a AND (b OR c)]; the port is marked as BAD otherwise. At 460, if a port is marked as BAD, then embodiments of this invention may initiate a re-authentication with the transmitting device. In this embodiment, a port that is marked BAD means a situation has been detected that indicates Tx and Rx may be out of sync.

Figure 5:
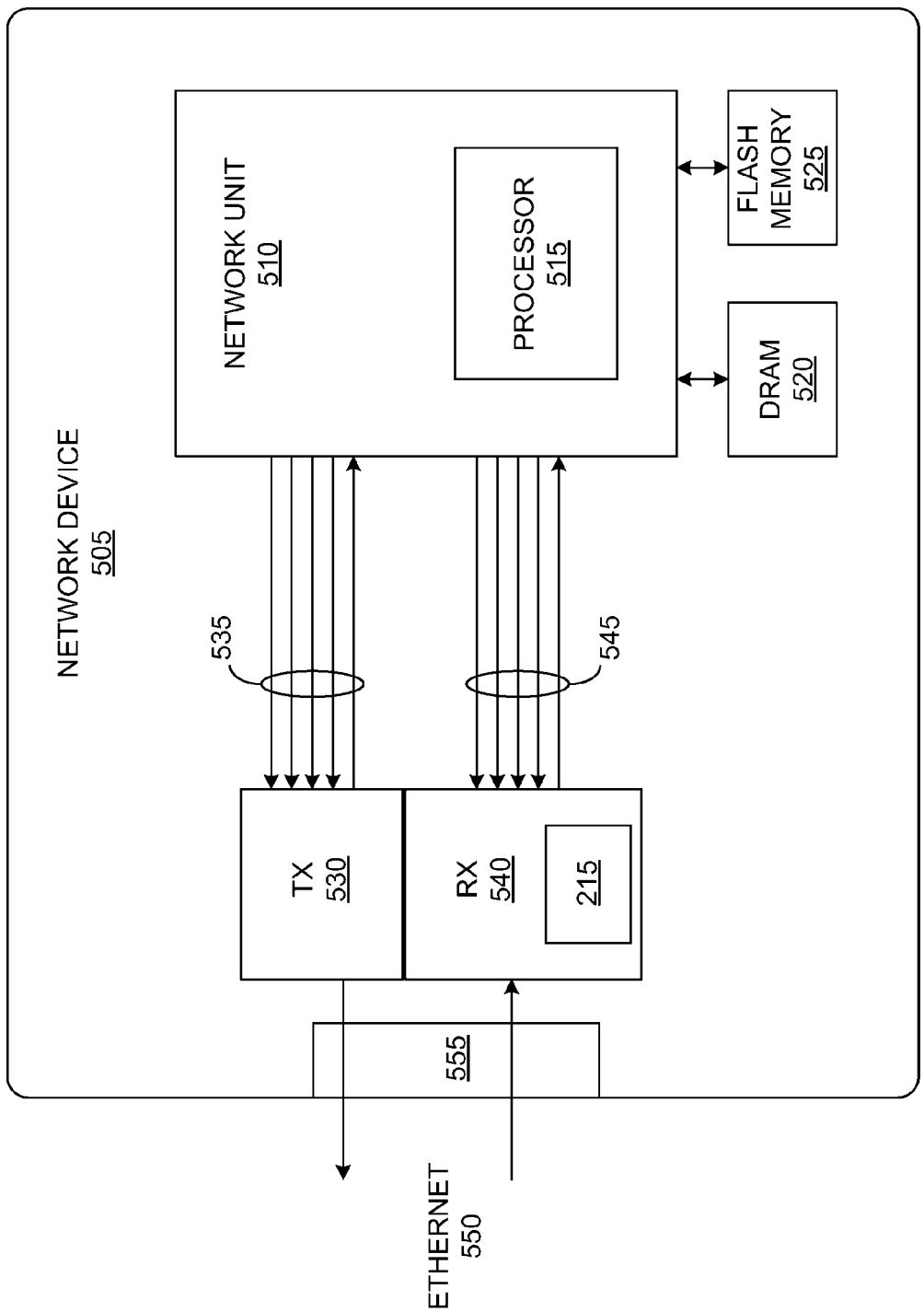
FIG. 5 illustrates components of a network computer device employing an embodiment of the invention.

FIG. 5 illustrates components of a network computer device 505 employing an embodiment of the present invention. In this illustration, a network device 505 may be any device in a network, including, but not limited to, a television, a cable set-top box, a radio, a DVD player, a CD player, a smart phone, a storage unit, a game console, or other media device. In some embodiments, the network device 505 includes a network unit 510 to provide network functions. The network functions include, but are not limited to, the generation, transfer, storage, and reception of media content streams. The network unit 510 may be implemented as a single system on a chip (SoC) or as multiple components.

In some embodiments, the network unit 510 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 520 or other similar memory and flash memory 525 or other nonvolatile memory.

The network device 505 may also include a transmitter 530 and/or a receiver 540 for transmission of data on the network or the reception of data from the network, respectively, via one or more network interfaces 555. Receiver 540 includes synchronization detector 215 as detailed in FIG. 2. The transmitter 530 or receiver 540 may be connected to a wired transmission cable, including, for example, an Ethernet cable 550, a coaxial cable, or to a wireless unit. The transmitter 530 or receiver 540 may be coupled with one or more lines, such as lines 535 for data transmission and lines 545 for data reception, to the network unit 510 for data transfer and control signals. Additional connections may also be present. The network device 505 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine executable instructions, which may be used to cause a general purpose or special purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer readable medium having stored thereon computer program instructions, which may be used to program a computer (or other electronic devices) to perform a process according to the embodiments of the present invention. The machine readable medium may include, but is not limited to, floppy diskettes, optical disks, compact disk read-only memory (CD ROM), and magneto optical disks, read-only memory (ROM), random access memory (RAM), erasable programmable read-only memory (EPROM), electrically EPROM (EEPROM), magnet or optical cards, flash memory, or other type of media/machine readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed:

1. A method comprising:
   authenticating a High-bandwidth Digital Content Protection (HDCP) transmitting device at a first port of an HDCP receiving device;
   connecting the first port of the HDCP receiving device to a pipe of an HDCP architecture of the HDCP receiving device at a first time;
   receiving a synchronization signal from the HDCP transmitting device at the first port of the HDCP receiving device at a second time;
   detecting a loss of synchronization between the HDCP transmitting device and the HDCP receiving device when a time-span between the first time and the second time is not greater than a period of time between synchronization signals sent from the HDCP transmitting device, wherein detecting further includes monitoring a roving pipe of a time-based roving architecture to select a roving pipe of a plurality of roving pipes to replace a main pipe previously selected by a user; and
   initiating a re-authentication between the HDCP transmitting device and the HDCP receiving device in response to detecting the loss of synchronization.

2. The method of claim 1, wherein the HDCP architecture of the HDCP receiving device implements a time-based roving architecture.

3. The method of claim 1, wherein the pipe of the HDCP architecture of the HDCP receiving device includes the main pipe.

4. The method of claim 1, wherein the pipe of the HDCP architecture of the HDCP receiving device includes the roving pipe.

5. An apparatus comprising:
   an HDCP receiving device including a first port to authenticate an HDCP transmitting device;
   an HDCP architecture of the HDCP receiving device to connect the first port of the HDCP receiving device to a pipe of the HDCP architecture at a first time;
   the first port to receive a synchronization signal from the HDCP transmitting device at a second time;
   a synchronization detector to detect a loss of synchronization between the HDCP transmitting device and the HDCP receiving device when a time-span between the first time and the second time is not greater than a period of time between synchronization signals sent from the HDCP transmitting device and to initiate a re-authentication between the HDCP transmitting device and the HDCP receiving device in response to detecting the loss of synchronization, wherein detecting further includes monitoring a roving pipe of a time-based roving architecture to select a roving pipe of a plurality of roving pipes to replace a main pipe previously selected by a user.

6. The apparatus of claim 5, wherein the HDCP architecture of the HDCP receiving device implements a time-based roving architecture.

7. The apparatus of claim 5, wherein the pipe of the HDCP architecture of the HDCP receiving device includes the main pipe.

8. The apparatus of claim 5, wherein the pipe of the HDCP architecture of the HDCP receiving device includes the roving pipe.

9. A system comprising:
   an HDCP transmitting device coupled to a first port of an HDCP receiving device, the HDCP transmitting device to transmit a data stream and synchronization signals to the HDCP receiving device;
   an HDCP receiving device including a first port to authenticate an HDCP transmitting device, the HDCP receiving device including an HDCP architecture;
   the HDCP architecture of the HDCP receiving device to connect the first port of the HDCP receiving device to a pipe of the HDCP architecture at a first time;
   the first port to receive a synchronization signal from the HDCP transmitting device at a second time;
   a synchronization detector to detect a loss of synchronization between the HDCP transmitting device and the HDCP receiving device when a time-span between the first time and the second time is not greater than a period of time between synchronization signals sent from the HDCP transmitting device and to initiate a re-authentication between the HDCP transmitting device and the HDCP receiving device in response to detecting the loss of synchronization, wherein detecting further includes monitoring a roving pipe of a time-based roving architecture to select a roving pipe of a plurality of roving pipes to replace a main pipe previously selected by a user.

10. The system of claim 9, wherein the HDCP architecture of the HDCP receiving device implements a time-based roving architecture.

11. The system of claim 9, wherein the pipe of the HDCP architecture of the HDCP receiving device includes the main pipe.

12. The system of claim 9, wherein the pipe of the HDCP architecture of the HDCP receiving device includes the roving pipe.

* * * * *